(12) United States Patent
Franz

(10) Patent No.: US 8,276,969 B2
(45) Date of Patent: Oct. 2, 2012

(54) FUEL DOOR ASSEMBLY WITH VIBRATION DAMPER

(75) Inventor: Michael E. Franz, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 179 days.

(21) Appl. No.: 12/690,234

(22) Filed: Jan. 20, 2010

(65) Prior Publication Data

US 2011/0175389 A1    Jul. 21, 2011

(51) Int. Cl.
B62D 25/00    (2006.01)

(52) U.S. Cl. .................................... 296/97.22

(58) Field of Classification Search ............... 296/97.22, 296/146.11, 155; 220/86.2, 905; 280/834; 16/227, 255
See application file for complete search history.

(56) References Cited

U.S. PATENT DOCUMENTS

| | | | |
|---|---|---|---|
| 4,527,825 A | 7/1985 | Clouse | |
| 4,971,382 A * | 11/1990 | Ohno | 296/97.22 |
| 5,437,491 A * | 8/1995 | Nedbal et al. | 296/97.22 |
| 5,718,471 A | 2/1998 | McHorse | |
| 5,836,638 A | 11/1998 | Slocum | |
| 5,906,406 A * | 5/1999 | Pajakowski | 296/97.22 |
| 5,924,757 A | 7/1999 | Stapf | |
| 6,189,959 B1 | 2/2001 | VanAssche et al. | |
| 6,231,107 B1 | 5/2001 | Mukai | |
| 6,752,448 B1 * | 6/2004 | Hsu | 296/97.22 |
| 6,938,303 B2 * | 9/2005 | Watson et al. | 16/334 |
| 7,258,386 B2 | 8/2007 | Leitner | |
| 7,311,348 B1 * | 12/2007 | Bang | 296/97.22 |
| 7,549,694 B2 | 6/2009 | Scott et al. | |
| 2005/0146157 A1 * | 7/2005 | Leitner | 296/97.22 |
| 2007/0040409 A1 | 2/2007 | Alfaro | |
| 2009/0217503 A1 * | 9/2009 | Scott et al. | 29/428 |

* cited by examiner

*Primary Examiner* — Glenn Dayoan
*Assistant Examiner* — Sunsurraye Westbrook
(74) *Attorney, Agent, or Firm* — Clifford B. Vaterlaus, Esq.; Emerson Thomson Bennett

(57) ABSTRACT

A fuel door assembly may use a vibration damper made as a single part with a contact surface of the vehicle body or a contact surface of the fuel door. In one embodiment, when the fuel door is moved to an open condition a contact surface of the fuel door contacts a contact surface of a vehicle body to dampen vibrations thereby.

17 Claims, 5 Drawing Sheets

FUEL DOOR ASSEMBLY WITH VIBRATION DAMPER

I. BACKGROUND

A. Field of Invention

This invention generally relates to motor vehicles and more specifically relates to a fuel door that when opened interacts with a vibration damper made as a single part with the vehicle body or the fuel door to dampen vibrations.

B. Description of the Related Art

It is well known in the art for passenger vehicles to have a fuel tank which stores fuel used to operate the vehicle's engine. Typically a fuel filling pipe extends from the fuel tank up to an opening formed in the side of the vehicle's body. In order to access the top of the fuel filling pipe in order to fill the fuel tank with fuel, a fuel door is moved from a closed condition where access to the fuel filling pipe through the opening is prevented to an open condition where access to the fuel filling pipe can be achieved through the opening. Once the fuel door is opened, a cap can be removed from the outer end of the fuel filling pipe and fuel can then be added to the fuel filling pipe and thus to the fuel tank. Once the fuel tank is filled, the cap can be replaced and the fuel door can then be moved back to the closed condition.

With reference now to FIGS. 4 and 5, typically the fuel door 1 is moved between its closed condition and its open condition (open condition shown in FIG. 4) along arc 2 by pivoting or rotating the fuel door about a pivot axis 3. While such known fuel doors generally work well for their intended purpose, they have a disadvantage. The disadvantage is that when the fuel door 1 is opened, a contact surface 4 of the fuel door contacts a contact surface 5 of the vehicle body 6 causing a vibration. Given the materials used to make the contact surfaces 4 and 5 (typically both are made of a relatively hard plastic) the vibration may cause an audible noise that is undesirable.

What is needed and provided by this invention are apparatuses and methods that overcome this disadvantage.

II. SUMMARY

According to one embodiment of this invention, a fuel door assembly may be used with an associated vehicle having: (1) a body that: (a) defines an outside surface for the vehicle; (b) has an opening; and, (c) has a contact surface; and, (2) a fuel filling pipe that is used to communicate fuel from the opening to a fuel tank. The fuel door assembly may comprise: a fuel door that is movable with respect to the body between: (1) a closed condition where the fuel door substantially closes the opening; and, (2) an open condition where: (a) the fuel door provides access to the fuel filling pipe through the opening; and, (b) a contact surface of the fuel door contacts the contact surface of the body; and, a vibration damper made as a single part with one of the contact surface of the body and the contact surface of the fuel door.

According to another embodiment of this invention, a method may comprise the steps of: (A) providing a vehicle comprising: a frame; a body that: (1) is supported to the frame; (2) defines an outside surface for the vehicle; (3) has an opening; and, (4) has a contact surface; a fuel tank supported to the frame; and, a fuel filling pipe that: (1) is used to communicate fuel from the opening to the fuel tank; (2) has a first end operatively attached to the fuel tank; and (3) has a second end positioned juxtaposed to the opening in the body; (B) providing a fuel door assembly comprising: a fuel door having a contact surface; and, a vibration damper made as a single part with one of the contact surface of the body and the contact surface of the fuel door; (C) moving the fuel door with respect to the body to an open condition where the fuel door provides access to the fuel filling pipe through the opening Step (C) may comprise the step of: causing the contact surface of the fuel door to contact the contact surface of the body and dampen vibrations thereby.

According to yet another embodiment of this invention, a vehicle may comprise: a frame; a body that: (1) is supported to the frame; (2) defines an outside surface for the vehicle; (3) has an opening; and, (4) has a contact surface; a fuel tank supported to the frame; a fuel filling pipe that: (1) is used to communicate fuel from the opening to the fuel tank; (2) has a first end operatively attached to the fuel tank; and (3) has a second end positioned juxtaposed to the opening in the body; and, a fuel door assembly comprising: a fuel housing that: (1) is supported to the frame; (2) defines a compartment having: (a) a floor; and, (b) a wall into which at least a portion of the opening is positioned; and, (3) receives an end of the fuel filling pipe; a vibration damper made as a single part with the contact surface of the body; and, a fuel door that is supported to the fuel housing and movable with respect to the body between: (1) a closed condition where the fuel door substantially closes the opening; and, (2) an open condition where: (a) the fuel door provides access to the fuel filling pipe through the opening; and, (b) a contact surface of the fuel door contacts the vibration damper of the body portion.

One advantage of this invention is that the unwanted noise caused by opening a fuel door can be greatly diminished.

Another advantage of this invention is that a vibration damper can be made as a single part with the vehicle body or the fuel door.

Yet another advantage of this invention is that the vibration damper is relatively easy and inexpensive to manufacture and use.

Other benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
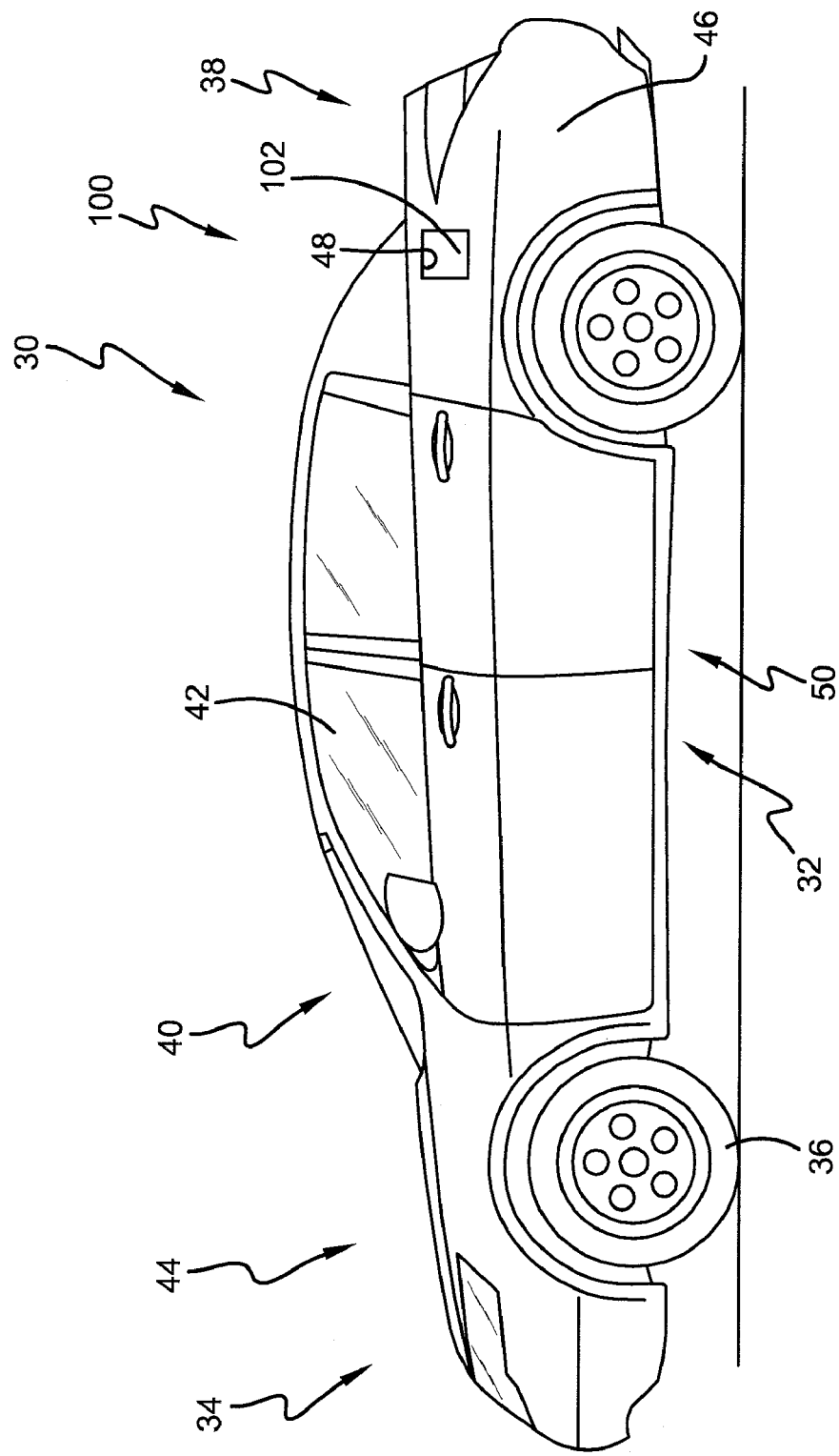
FIG. 1 is a side view of a vehicle equipped with a fuel door assembly.

Referring now to the drawings wherein the showings are for purposes of illustrating embodiments of the invention only and not for purposes of limiting the same, and wherein like reference numerals are understood to refer to like components, FIG. 1 shows a vehicle 30 having a fuel door assembly 100 according to one embodiment of this invention. While the vehicle 30 shown is an automobile, it is to be understood that the fuel door assembly 100 of this invention will work well with any vehicle including, but not limited to, cars, trucks, sport utility vehicles, cross-over vehicles, off-road vehicles, all-terrain vehicles, and airplanes as well as other passenger carrying devices such as boats. This invention may also work well in non-vehicle applications.

With continuing reference to FIG. 1, the vehicle 30 may include a frame 32 and a body 40 that is supported to the frame and that defines a passenger compartment 42 for housing passengers as is well known in the art, a locomotion compartment 44, and a storage compartment or trunk 38. The vehicle 30 may also include a locomotion source, such as an internal combustion engine (ICE) 34, mounted to the frame 32 and positioned substantially within the locomotion compartment 44. The vehicle 30 may also have one or more ground engaging wheels 36 for uses well known in the art such as steering and transferring power from the locomotion source 34 to provide locomotion for the vehicle 30.

Figure 2:
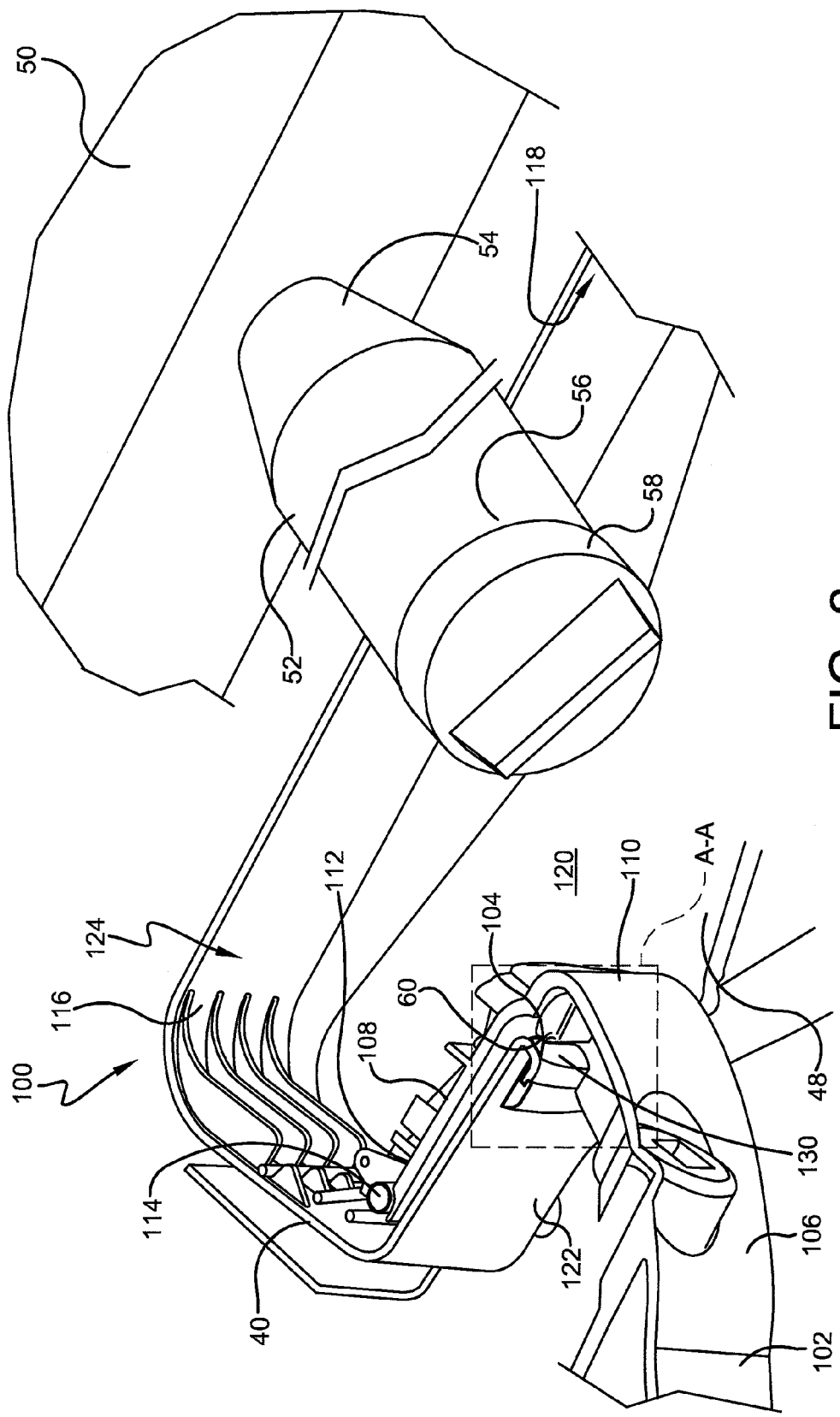
FIG. 2 is a perspective view, partially in schematic form, of a vehicle and a fuel door assembly according to this invention.

With reference now to FIGS. 1-2, the body 40 may be formed in any conventional manner and may define an outside surface 46 for the vehicle 30. The body 40 may have an opening 48 formed therethrough. The opening 48 may be of any size and shape chosen with the sound judgment of a person of skill in the art. The body 40 may also have a contact surface 60 used as will be discussed further below. The vehicle 30 may also include a fuel tank 50 supported to the frame 32 and shown schematically in FIG. 2, and a fuel filling pipe 52 used to communicate fuel from the opening 48 to the fuel tank 50 so that the fuel tank 50 can be filled with fuel. The fuel filling pipe 52 may thus have a first end 54 operatively attached to the fuel tank 50 and a second end 56 positioned juxtaposed to the opening 48 in the body 46. A cover cap 58 may be attachable to and detachable from the second end 56 of the fuel filling pipe 52 in any manner such as via a threading engagement as is well known in the art.

Figure 3:
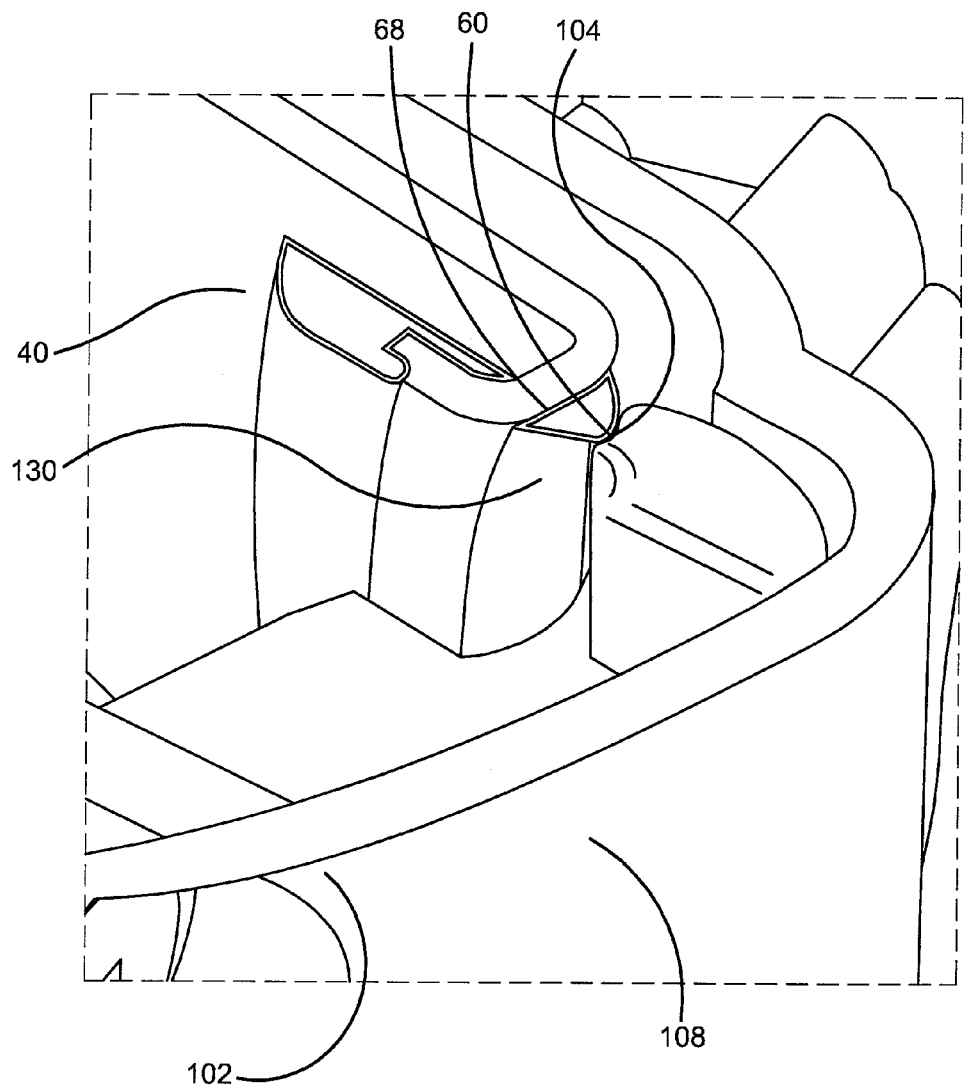
FIG. 3 is a close up view of area A-A from FIG. 2.
Figure 4:
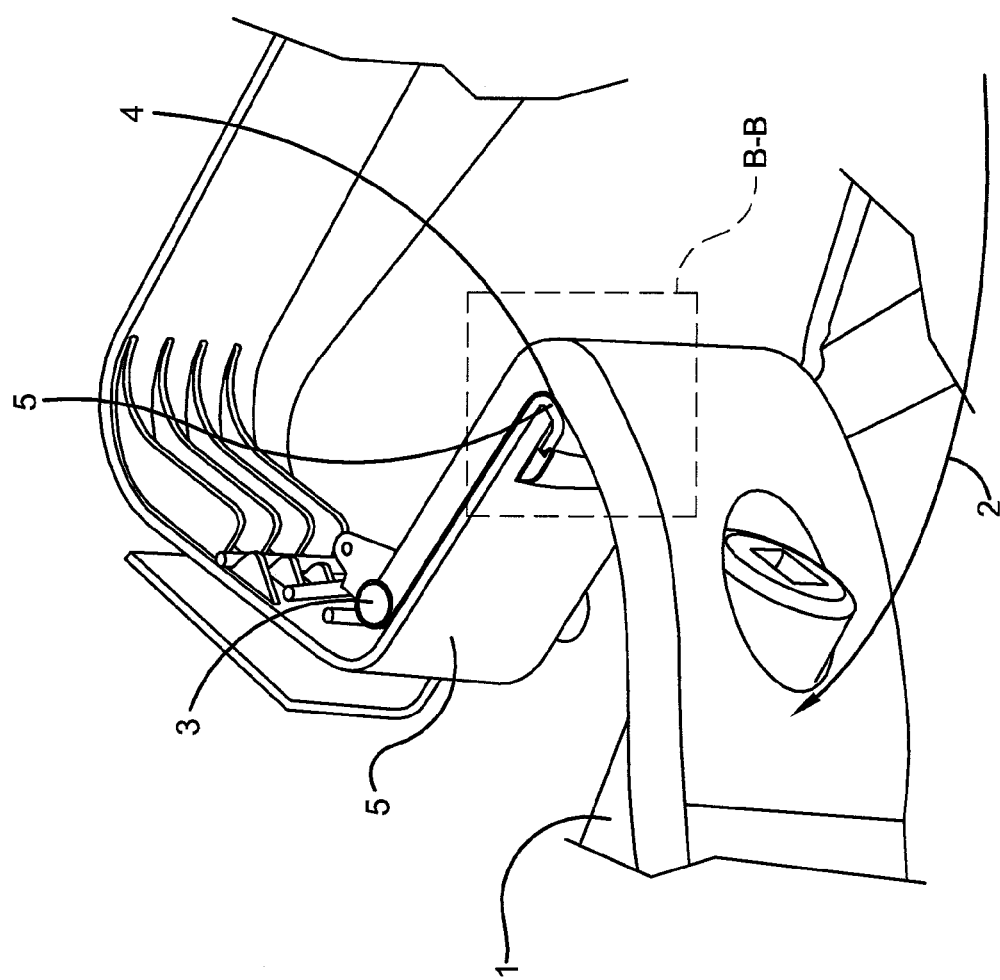
FIG. 4 is a perspective view of a known fuel door assembly.
Figure 5:
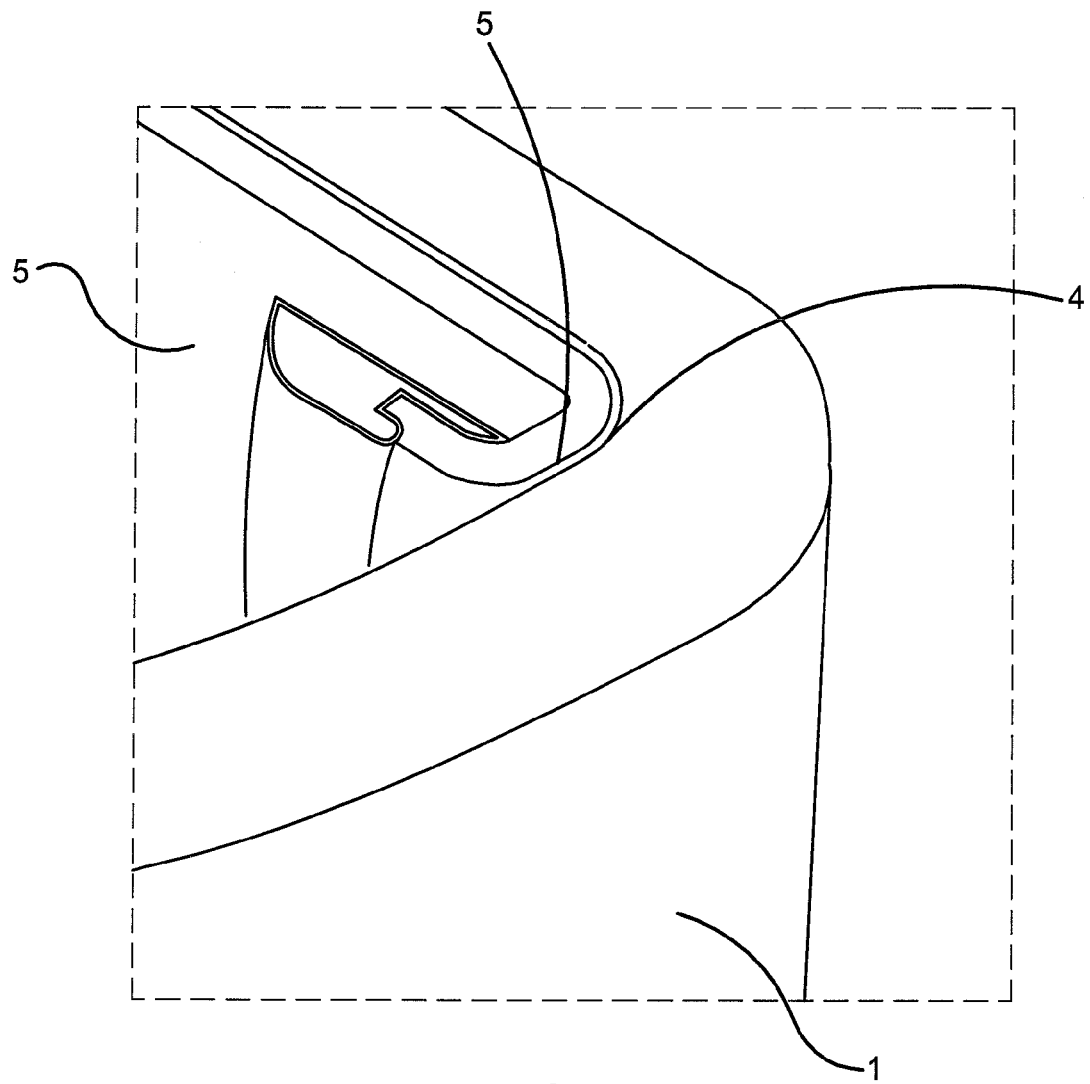
FIG. 5 is a close up view of area B-B from FIG. 4.

With reference now to FIGS. 2-3, the fuel door assembly 100 may include a fuel door 102 that is movable with respect to the body between: (1) a closed condition where the fuel door 102 substantially closes the opening 48 preventing access to the fuel filling pipe 52 through the opening 48; and, (2) an open condition (shown in FIG. 2) where the fuel door 102 provides access to the fuel filling pipe 52 through the opening 48. A latching mechanism (not shown) of any type chosen with the sound judgment of a person of skill in the art may be used to latch the fuel door 102 in the closed condition. The fuel door 102 may have a contact surface 104 that contacts the contact surface 60 of the body 40 as will be discussed further below. The particular design and operation of the fuel door 102 can be any chosen with the sound judgment of a person of skill in the art. For the embodiment shown, the fuel door 102 includes a lid 106 that substantially closes the opening 48 when the fuel door 102 is in the closed condition. The fuel door 102 may also include an arm 108 that has a first end 110 attached to the lid 106 and a second end 112 that extends through the opening 48 and is pivotally attached, via pivot connector 114, to the body 40. It is also contemplated that the fuel door 102 may move relative to the body 40 in other manners including, but not limited to, relative rotational movement and relative sliding movement. The contact surface 104 for the fuel door 102 may positioned on any portion of the fuel door 102 chosen with the sound judgment of a person of skill in the art. For the embodiment shown, the contact surface 104 is formed on an outer surface of the arm 108. The contact surface 60 for the body 40 may also be positioned on any portion of the body 40 chosen with the sound judgment of a person of skill in the art. For the embodiment shown, the contact surface 60 is formed on a rim 68 that defines the opening 48.

With reference now to FIG. 2, the fuel door assembly 100 may also include a fuel housing 116 that is supported to the frame 32. The fuel housing 116 may define a compartment 118 having a floor 120 and at least one wall 122. The fuel housing 116 may receive the second end 56 of the fuel filling pipe 52 as shown. While the particular location for the opening 48 can be any chosen with the sound judgment of a person of skill in the art, for the embodiment shown at least a portion of the opening 48 is positioned in the wall 122. For embodiments where a fuel housing 116 is used, the fuel door 102 may be supported to the fuel housing 116. For the embodiment shown, the pivot connector 114 is connected to the fuel housing 116. A portion 124 of the compartment 118 may receive the first end 110 of the arm 108 as the fuel door 102 is moved between the open and closed conditions.

With reference now to FIGS. 2-3, the fuel door assembly 100 may also include a vibration damper 130 that dampens the vibrations caused when the contact surface 104 of the fuel door 102 contacts the contact surface 60 of the body 40. The vibration damper 130 may be positioned on the contact surface 104 of the fuel door 102 or, as shown, positioned on the contact surface 60 of the body 40. To simplify manufacturing, the vibration damper 130 may be made as a single part with the contact surface 104 of the fuel door 102 or with the contact surface 60 of the body 40. The methods used to make the vibration damper 130 as a single part with the contact surface 104 or 60, can be any chosen with the sound judgment of a person of skill in the art. In one embodiment, the vibration damper 130 is overmolded to the contact surface 104 or 60 in any conventional manner. The material(s) used to make the vibration damper 130 can be any chosen with the sound judgment of a person of skill in the art. In one embodiment, the vibration damper 130 is formed substantially of a thermoplastic elastomer polyolefin (TPO).

With reference now to FIGS. 1-3, the operation of the fuel door assembly 100 is very simple. The fuel door 102 is first unlatched (if a latching mechanism is used) and the fuel door 102 is then moved from the closed condition to the open condition. In one embodiment, this motion entails the pivoting of the fuel door 102 as described above. As the fuel door 102 is opened, the contact surface 104 of the fuel door 102 contacts the contact surface 60 of the body 40. As this contact is made, the vibration damper 130 dampens the vibrations and thereby eliminates or reduces unwanted noise. While the fuel door 104 is open, fuel may be inserted into the fuel filing pipe 52 (after the cap 58 is removed). Once fueling is complete, the cap 58 may be reattached and the fuel door 104 may be moved back into the closed condition.

Numerous embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

Having thus described the invention, it is now claimed:

1. A fuel door assembly for use with an associated vehicle having:
   (1) a body that: (a) defines an outside surface for the vehicle; (b) has an opening; and, (c) has a contact surface; and,
   (2) a fuel filling pipe that is used to communicate fuel from the opening to a fuel tank, the fuel door assembly comprising:
   a fuel door that is movable with respect to the body between: (1) a closed condition where the fuel door substantially closes the opening; and, (2) an open condition where: (a) the fuel door provides access to the fuel filling pipe through the opening; and, (b) a contact surface of the fuel door contacts the contact surface of the body; and, a vibration damper made as a single part with and overmolded on one of the contact surface of the body and the contact surface of the fuel door that dampens vibration between the fuel door and the body when the fuel door is in the open condition.

2. The fuel door assembly of claim 1 wherein the vibration damper is formed substantially of a thermoplastic elastomer polyolefin.

3. The fuel door assembly of claim 1 wherein the fuel door is pivotal with respect to the body between the closed condition and the open condition.

4. The fuel door assembly of claim 3 wherein the vibration damper is positioned on a rim that defines the opening.

5. The fuel door assembly of claim 1 wherein:
the fuel door assembly comprises: a fuel housing that: (1) defines a compartment having: (a) a floor; and, (b) a wall into which at least a portion of the opening is positioned; and, (2) receives an end of the fuel filling pipe; and,
the fuel door is supported to the fuel housing.

6. The fuel door assembly of claim 5 wherein:
the fuel door comprises: (1) a lid that substantially closes the opening when the fuel door is in the closed condition; (2) an arm that has a first end attached to the lid and a second end that extends through the opening and is pivotally attached to the fuel housing within the compartment.

7. The fuel door assembly of claim 6 wherein the contact surface of the fuel door is positioned on the arm.

8. A method comprising the steps of:
(A) providing a vehicle comprising: a frame; a body that: (1) is supported to the frame; (2) defines an outside surface for the vehicle; (3) has an opening; and, (4) has a contact surface; a fuel tank supported to the frame; and, a fuel filling pipe that: (1) is used to communicate fuel from the opening to the fuel tank; (2) has a first end operatively attached to the fuel tank; and (3) has a second end positioned juxtaposed to the opening in the body;
(B) providing a fuel door assembly comprising: a fuel door having a contact surface; and, a vibration damper made as a single part with one of the contact surface of the body and overmolded on the contact surface of the fuel door;
(C) moving the fuel door with respect to the body to an open condition where the fuel door provides access to the fuel filling pipe through the opening; and,
wherein step (C) comprises the step of: causing the contact surface of the fuel door to contact the contact surface of the body and dampen vibrations thereby.

9. The method of claim 8 wherein:
step (B) comprises the step of: forming the vibration damper substantially of a thermoplastic elastomer polyolefin.

10. The method of claim 8 wherein:
step (B) comprises the step of: positioning the vibration damper on a rim that defines the opening.

11. The method of claim 8 wherein:
step (C) comprises the step of: pivoting the fuel door with respect to the body from a closed condition where the fuel door substantially closes the opening to the open condition.

12. The method of claim 8 wherein:
step (B) comprises the steps of: providing the fuel door assembly with: a fuel housing that: (1) defines a compartment having: (a) a floor; and, (b) a wall into which at least a portion of the opening is positioned; and, (2) receives an end of the fuel filling pipe; and, supporting the fuel door to the fuel housing.

13. The method of claim 12 wherein:
step (B) comprises the steps of:
providing the fuel door with: (1) a lid that substantially closes the opening when the fuel door is in the closed condition; and, (2) an arm that has a first end attached to the lid and a second end that extends through the opening and is pivotally attached to the fuel housing within the compartment; and,
providing the contact surface of the fuel door on the arm; and,
step (C) comprises the step of: pivoting the fuel door with respect to the body from a closed condition where the lid substantially closes the opening to the open condition where the lid provides access to the fuel filling pipe through the opening.

14. A vehicle comprising:
a frame;
a body that: (1) is supported to the frame; (2) defines an outside surface for the vehicle; (3) has an opening; and, (4) has a contact surface; a fuel tank supported to the frame; a fuel filling pipe that: (1) is used to communicate fuel from the opening to the fuel tank; (2) has a first end operatively attached to the fuel tank; and (3) has a second end positioned juxtaposed to the opening in the body; and,
a fuel door assembly comprising:
a fuel housing that: (1) is supported to the frame; (2) defines a compartment having: (a) a floor; and, (b) a wall into which at least a portion of the opening is positioned; and, (3) receives an end of the fuel filling pipe;
a vibration damper made as a single part with and overmolded on the contact surface of the body; and,
a fuel door that is supported to the fuel housing and movable with respect to the body between: (1) a closed condition where the fuel door substantially closes the opening; and, (2) an open condition where: (a) the fuel door provides access to the fuel filling pipe through the opening; and, (b) a contact surface of the fuel door contacts the vibration damper of the body portion to dampen vibration between the fuel door and the body.

15. The vehicle of claim 14 wherein the vibration damper is formed substantially of a thermoplastic elastomer polyolefin.

16. The vehicle of claim 15 wherein the fuel door is pivotal with respect to the body between the closed condition and the open condition.

17. The vehicle of claim 16 wherein:
the vibration damper is positioned on a rim that defines the opening;
the fuel door comprises: (1) a lid that substantially closes the opening when the fuel door is in the closed condition; and, (2) an arm that has a first end attached to the lid and a second end that extends through the opening and is pivotally attached to the fuel housing within the compartment; and,
the contact surface of the fuel door is positioned on the arm.

* * * * *